United States Patent
Wright et al.

(10) Patent No.: US 7,762,300 B2
(45) Date of Patent: Jul. 27, 2010

(54) APPARATUS FOR MANUFACTURING RECLOSABLE BAGS UTILIZING ZIPPER TAPE MATERIAL

(75) Inventors: Donald K. Wright, Murphysboro, IL (US); Christopher L. Pemberton, Marion, IL (US); James K Hankins, Harrisburg, IL (US)

(73) Assignee: Com-Pac International, Inc., Carbondale, IL (US)

( * ) Notice: Subject to any disclaimer, the term of this patent is extended or adjusted under 35 U.S.C. 154(b) by 335 days.

(21) Appl. No.: 10/996,563

(22) Filed: Nov. 23, 2004

(65) Prior Publication Data

US 2005/0067110 A1     Mar. 31, 2005

Related U.S. Application Data

(62) Division of application No. 10/039,527, filed on Nov. 7, 2001, now Pat. No. 6,863,754.

(51) Int. Cl.
    *B32B 37/00* (2006.01)
(52) U.S. Cl. .................... 156/353; 156/519
(58) Field of Classification Search ............ 156/519, 156/252, 253, 265, 302, 308.2, 353; 53/133.4, 53/139.2; 493/213; 383/63, 66; 700/303; 73/865.8
See application file for complete search history.

(56) References Cited

U.S. PATENT DOCUMENTS

| | | |
|---|---|---|
| 4,019,819 A | 4/1977 | Lodzinski |
| 4,310,885 A | 1/1982 | Azcua et al. |
| 4,589,145 A | 5/1986 | Van Erden et al. |
| 4,594,925 A | 6/1986 | Ishikawa |
| 4,617,683 A | 10/1986 | Christoff |
| 4,655,862 A | 4/1987 | Christoff et al. |
| 4,773,760 A | 9/1988 | Makkonen |
| 4,894,975 A | 1/1990 | Ausnit |
| 5,024,537 A | 6/1991 | Tilman |
| 5,071,689 A | 12/1991 | Tilman |
| 5,182,121 A * | 1/1993 | Miyashita et al. ........... 425/338 |
| 5,435,864 A | 7/1995 | Machacek et al. |
| 5,529,659 A * | 6/1996 | Ellsworth et al. ........... 156/552 |
| 5,540,425 A | 7/1996 | Graef et al. |

(Continued)

FOREIGN PATENT DOCUMENTS

EP     0528721 A2    2/1993

(Continued)

*Primary Examiner*—James Sells
(74) *Attorney, Agent, or Firm*—Vedder Price PC

(57) ABSTRACT

A reclosable zipper strip is dispensed through a feeding mechanism and, when an optical sensor detects one of the splotch seal portions of the zipper strip, a desired length of zipper strip is advanced over an elevator platform. A knife is then signaled to descend and sever the advanced portion of zipper strip, which is thus deposited onto the elevator platform. As the selected portion of the zipper strip is being positioned and deposited onto the elevator, the web of flexible film is being positioned above the platform. A sealing head is then positioned over the web of flexible film, while at the same time the elevator platform is driven upwardly so that the zipper strip portion positioned thereon comes into contact with the web of flexible film. The heat passing through the web of flexible film creates an airtight seal of the zipper strip to the web.

4 Claims, 8 Drawing Sheets

U.S. PATENT DOCUMENTS

| | | | |
|---|---|---|---|
| 5,776,045 A * | 7/1998 | Bodolay et al. | 493/215 |
| 5,895,552 A | 4/1999 | Matsuguchi | |
| 6,003,582 A | 12/1999 | Blohowiak et al. | |
| 6,251,209 B1 | 6/2001 | Johnson | |

FOREIGN PATENT DOCUMENTS

| | | |
|---|---|---|
| EP | 0792802 A1 | 9/1997 |
| WO | WO 97/06062 | 2/1997 |

* cited by examiner

APPARATUS FOR MANUFACTURING RECLOSABLE BAGS UTILIZING ZIPPER TAPE MATERIAL

This is a divisional application based on and claims priority from application Ser. No. 10/039,527, filed Nov. 7, 2001, now U.S. Utility Pat. No. 6,863,754, issued on Mar. 8, 2005.

FIELD OF INVENTION

The present invention relates to an apparatus and method for sealing zipper tape to a web of flexible film in an airtight manner.

BACKGROUND OF THE INVENTION

The popularity of reclosable zipper fasteners has created a demand for a large number and wide variety of reclosable bag sizes and types. It is commonly known in the art to form a reclosable bag 10 through the addition of a zipper strip 420 to a pair of bag walls 22, 24 in order to form the bag 10 with a reclosable, airtight seal as shown in FIG. 7. Transverse application of such zipper strips 420 to a web of flexible film (such as a web of plastic material) is also known in the art.

In many reclosable bag applications, an airtight seal is necessary in order to maintain the freshness and integrity of items stored within the bag 10. However, presently available reclosable bags do not provide or maintain an airtight seal due to air leakage through the ends of the zipper strips, leakage through the seal between the strip and the web, or leakage through the interlocked fastener profiles of the zipper strips themselves. There is thus a need for an apparatus and method for sealing a zipper strip to a web that reduces or eliminates the afore-mentioned leaks. There is also a need for an apparatus and method for repeatedly and quickly sealing zipper tape to a web to allow for high-speed production of a web with pre-installed zipper-tape to make the production of reclosable bags commercially viable.

Commonly known methods of construction and seal formation often cause inaccurate, commercially unacceptable seals that cannot be produced on an economically practical scale. Commonly known zipper strip formation methods require multiple sealing devices, precise machinery or extensive retooling to alter the size and type of reclosable fastener. Examples of such devices and methods are described in U.S. Pat. No. 5,601,368 (Bodolay), U.S. Pat. No. 3,847,711 (Howard), U.S. Pat. No. 5,461,845 (Yeager), U.S. Pat. No. 4,241,865 (Ferrell), U.S. Pat. No. 4,335,817 (Bahr), U.S. Pat. No. 4,909,017 (McMahon) and U.S. Pat. No. 5,024,537 (Tilman). None of the foregoing devices and methods satisfy the need for a multi-purpose reclosable zipper strip that can be accurately and economically sealed in an airtight manner to a web of flexible film.

BRIEF SUMMARY OF THE INVENTION

The present invention overcomes the shortcomings of the foregoing prior art devices and meets the afore-mentioned needs by providing an apparatus and method for accurately sealing a multi-purpose reclosable fastener zipper strip to a web of flexible film in an airtight manner. Moreover, the inventive apparatus and method is capable of repeatedly performing the steps necessary to seal the reclosable fastener zipper strip to the web of flexible material while providing high manufacturing throughout and low cycle times.

Generally, the apparatus and method utilize a reclosable fastener zipper strip having airtight splotch seals fused in series along desired lengths of the reclosable fastener zipper strip. The reclosable fastener zipper strip is dispensed through a feeding mechanism and, when an optical sensor detects one of the splotch seal portions of the reclosable fastener zipper strip, a desired length of the reclosable fastener zipper strip is advanced over an elevator platform. A knife is then signaled to descend and sever the advanced portion of the reclosable fastener zipper strip, which is thus deposited onto the elevator platform.

As the selected portion of the reclosable fastener zipper strip is being positioned and deposited onto the elevator, the web of flexible film is being positioned above the platform. A sealing head is then positioned over the web of flexible film, while at the same time the elevator platform is driven upwardly so that the reclosable fastener zipper strip portion positioned thereon comes into contact with the web of flexible film. The heat passing through the web of flexible film from the sealing head is sufficient to seal the peripheral portions of the reclosable fastener zipper strip section to the web of flexible film, thereby creating an airtight seal between the reclosable fastener zipper strip portion and the web of flexible film.

DETAILED DESCRIPTION OF THE PREFERRED EMBODIMENT

Figure 1:
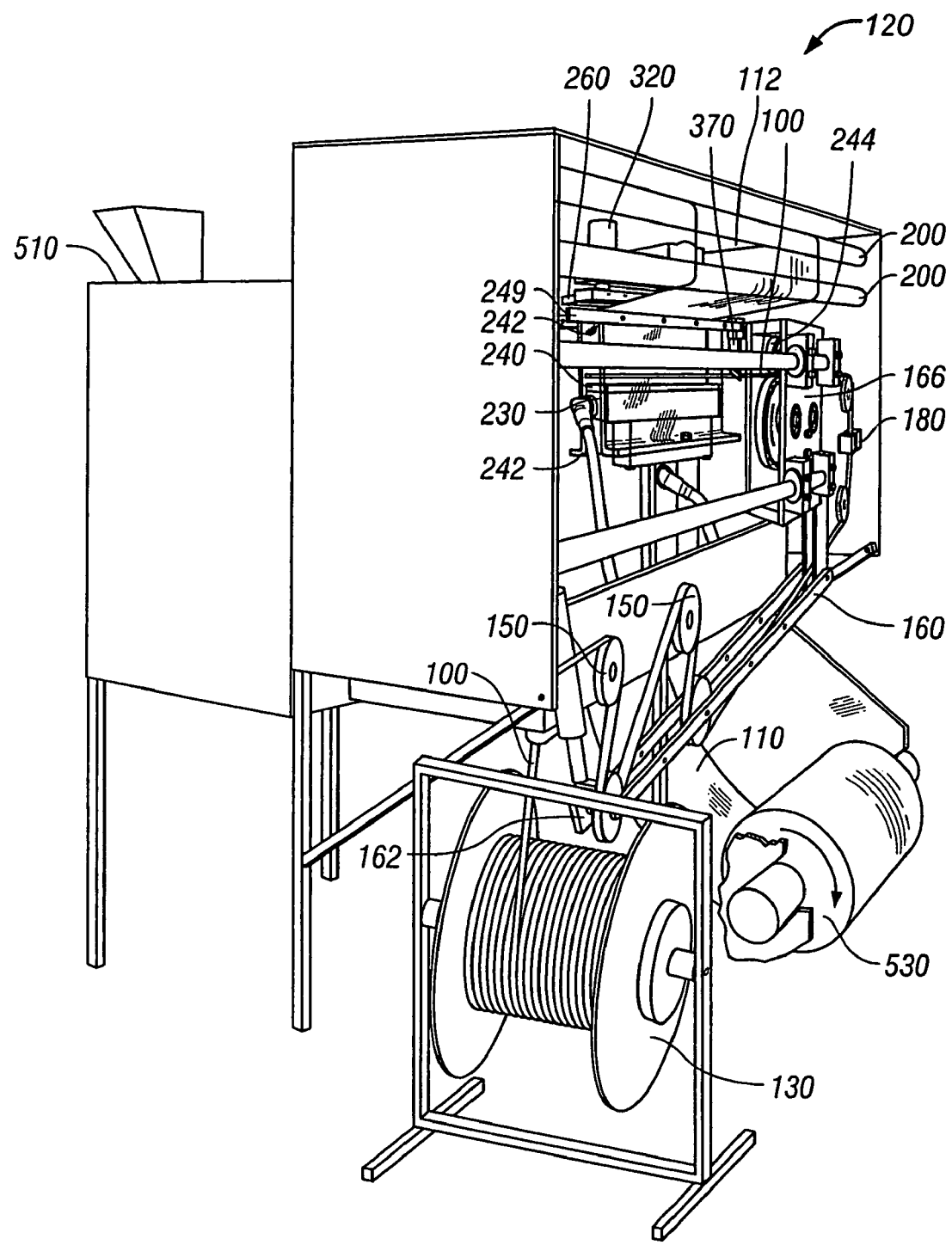
FIG. 1 is a front perspective view of a preferred embodiment of the apparatus of invention for sealing a reclosable fastener zipper strip to a web of flexible film.

The preferred embodiment of inventive apparatus 120 (best shown in FIGS. 1, 6 and 11) is capable of accurately sealing a multi-purpose reclosable zipper strip 100 to a flexible material web 110 in an airtight manner. Moreover, apparatus 120 is capable of repeatedly performing the steps necessary to seal the multi-purpose reclosable zipper strip 100 to the flexible material web 110 while providing high manufacturing throughout and low cycle times.

The multi-purpose reclosable zipper strip 100 is preferably constructed of polyethylene and may include additives such as ethylene acetate to facilitate easy sealing. The flexible material web 100 is also preferably constructed of polyethylene, but may be constructed of other commonly known films, such as polyproplene or polyethylene terepthalate (Saran®), or any other material providing a sealing layer that is compatible with the multi-purpose reclosable zipper strip 100.

Figure 10:
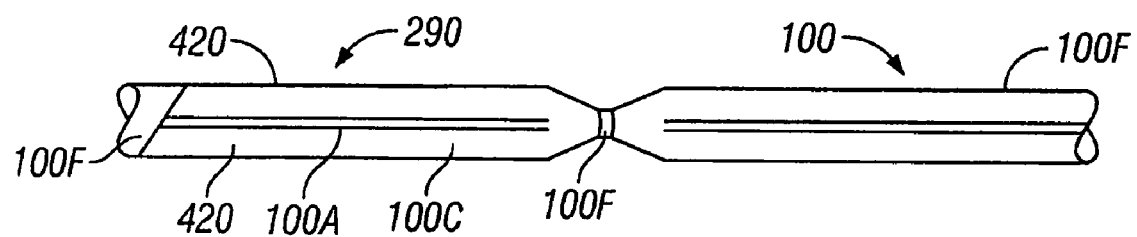
FIG. 10 is a front perspective view of the reclosable fastener zipper strip of FIG. 9 showing a series of interconnected reclosable fastener zipper strip sections having splotch sections between each section.
Figure 9:
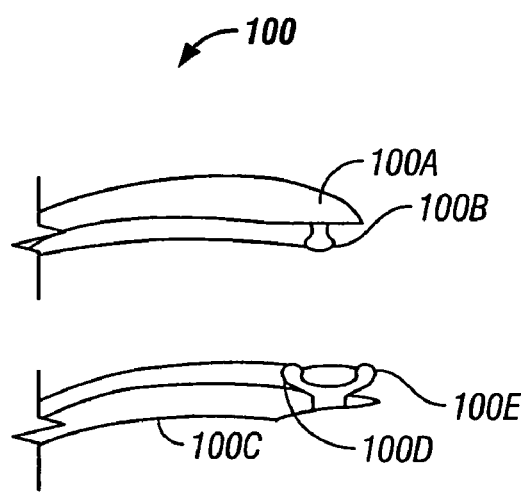
FIG. 9 is a front perspective view of the preferred embodiment of the reclosable fastener zipper strip of the present invention showing the fastener profiles of the first and second reclosable fastener zipper strip.

As shown in FIG. 9, the multi-purpose reclosable zipper strip 100 comprises (1) a continuous supply of first profile strip 100A; and (2) a continuous supply of second profile strip 100C opposite the first profile strip 100A. The first profile strip 100A includes at least one rib 100B protruding from and along the length of the inner surface of first profile strip 100A. The second profile strip 100C includes at least two ribs 100D and 100E for sealably receiving rib 100B. Ribs 100D and 100E protrude from and along the length of the inner surface of second profile strip 100C. As shown in FIG. 10, a series of splotch seal portions 100F are fused along desired lengths of the first profile strip 100A, the second profile strip 100C, and ribs 100B, 100D and 100E (shown in FIG. 9).

Figure 2:
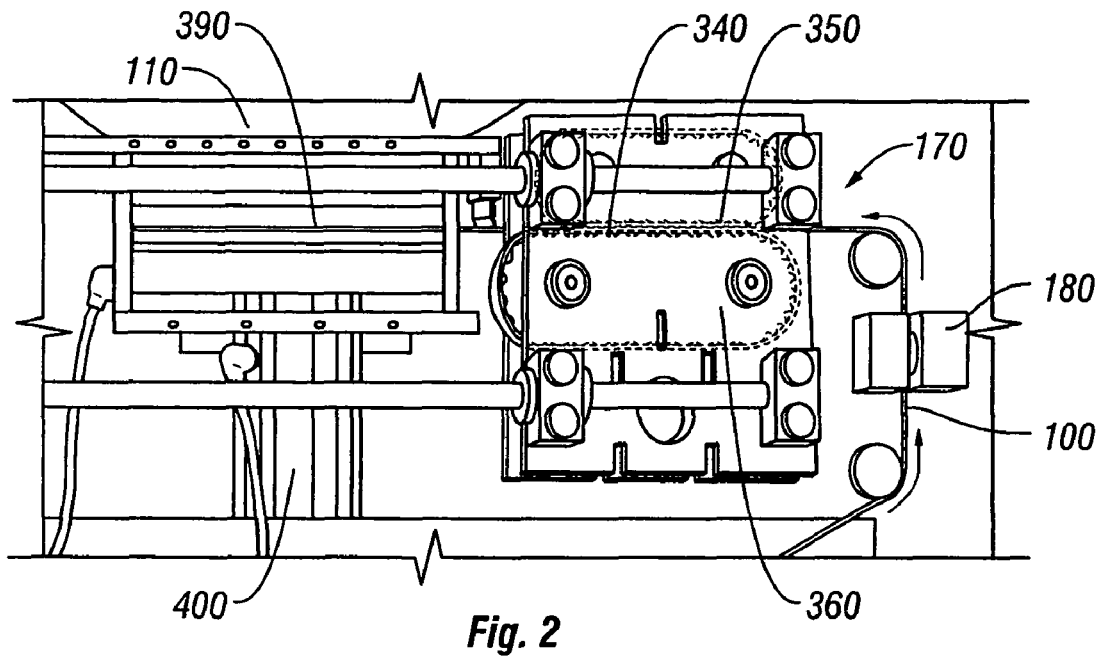
FIG. 2 is a partial front perspective view of the apparatus of FIG. 1 showing a pneumatically actuated elevator for placing the reclosable fastener zipper strip of the present invention against the web of flexible film.
Figure 6:
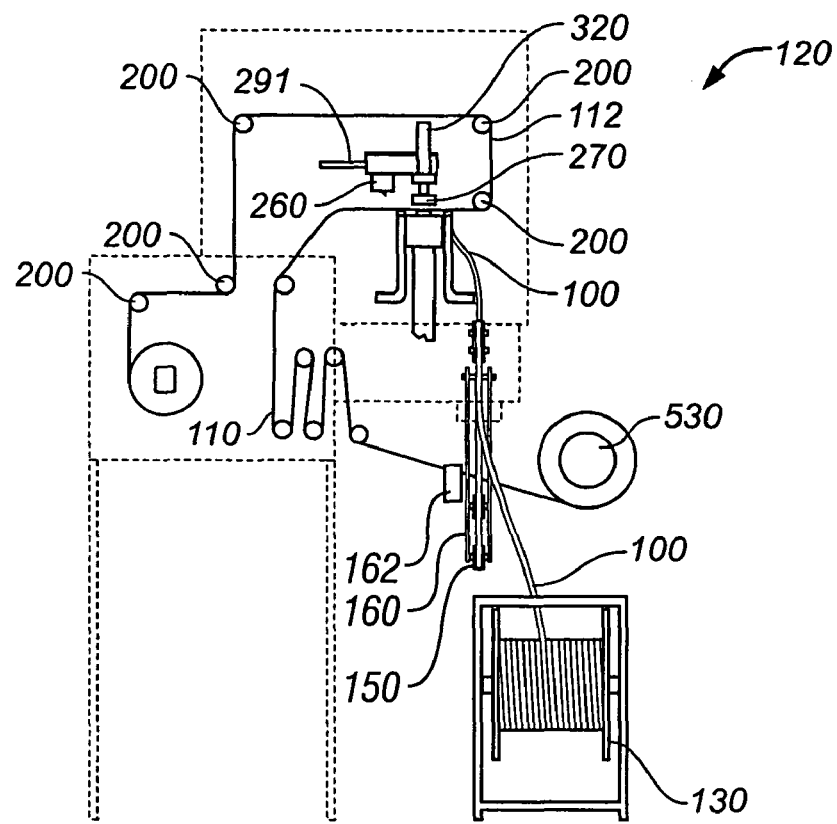
FIG. 6 is a side perspective view of the apparatus of FIG. 1.
Figure 6A:
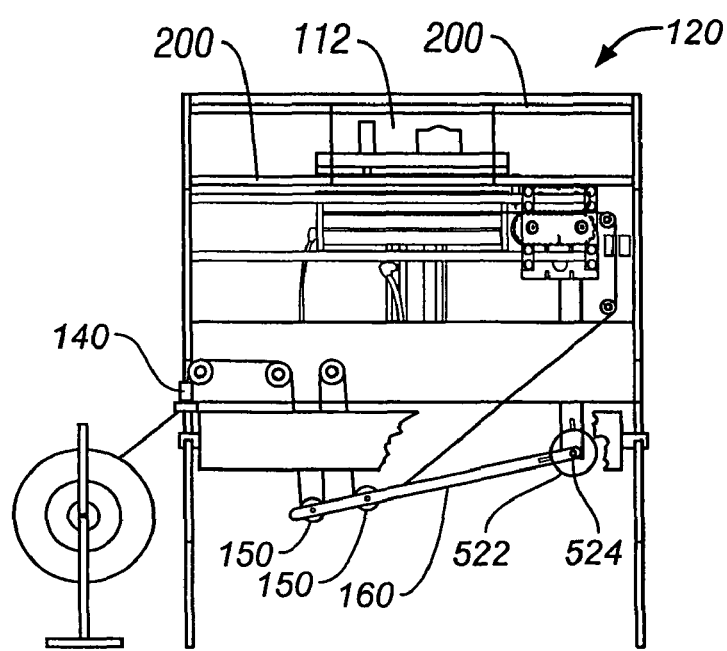
FIG. 6A is a front plan view of the apparatus of FIG. 1.
Figure 11:
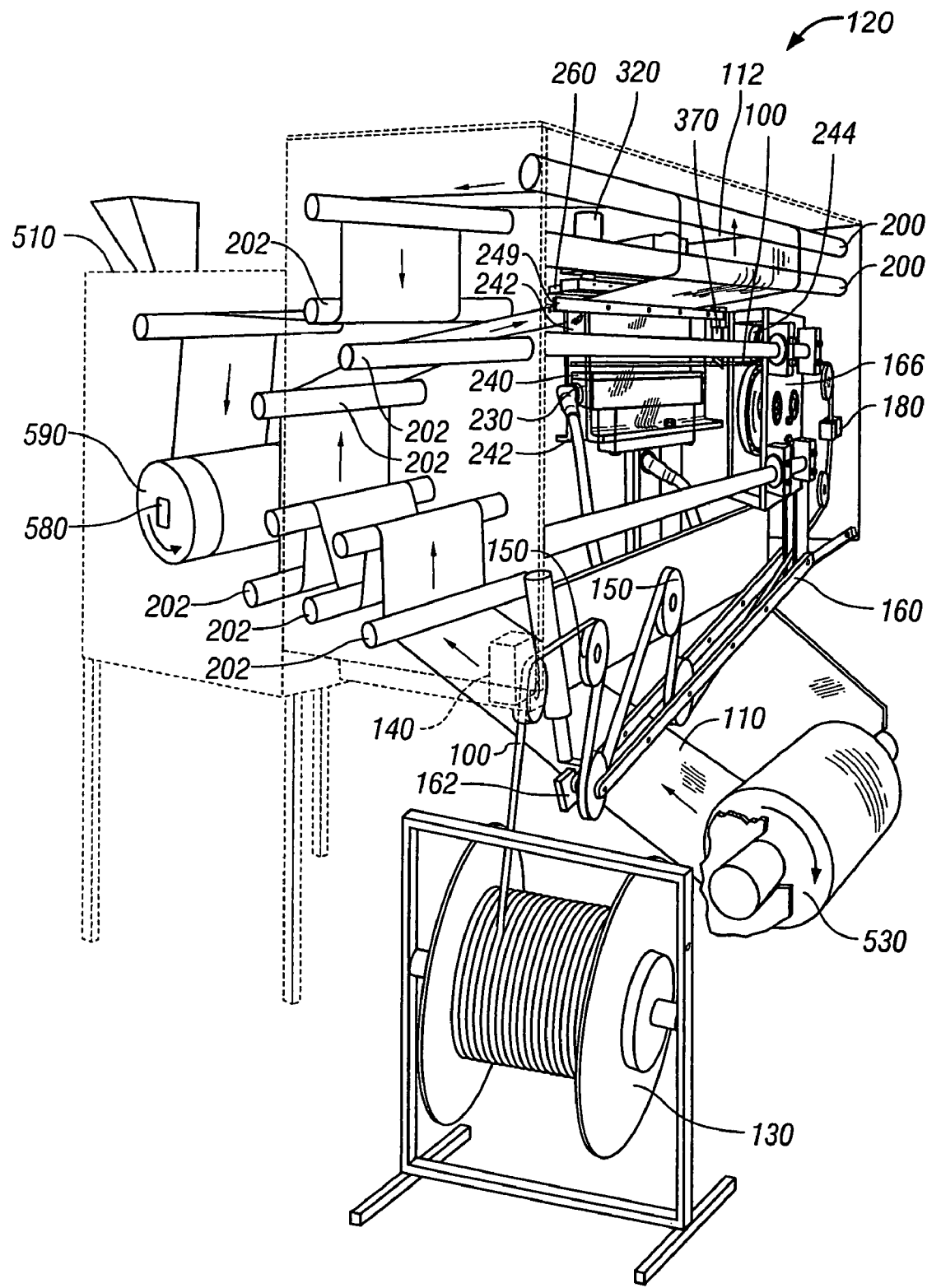
FIG. 11 is a front perspective view of a zipper tape application device applying the reclosable fastener zipper strip to a web of flexible material that is subsequently wound on a winder for later use in a bagging machine.

As seen in FIGS. 6 and 6A, the multi-purpose reclosable zipper strip 100 is stored on fastener supply roll 130, from which it is fed through apparatus 120 by a servometer 140, which controls the acceleration, speed and deceleration of the multi-purpose reclosable zipper strip 100's movement through apparatus 120. The multi-purpose reclosable zipper strip 100 is wound through a series of dancer rollers 150 on dancer arm 160, which allows the multi-purpose reclosable zipper strip 100 to be fed into a feeding mechanism 170 at the desired tension as shown in FIG. 2. In a preferred embodiment, as shown in FIG. 11, a photosensor 162 reads the position of the dancer arm 160 and, when the dancer arm 160 is descended to a desired position, advances the multi-purpose reclosable zipper strip 100 using a nip drive 166.

The feeding mechanism 170 utilizes an optical sensor 180 to detect the presence of the splotch seal portions 100F. The optical sensor 180 detects the thickness of the multi-purpose reclosable zipper strip 100 and is thus able to detect and distinguish each splotch seal portion 100F because such portions are thinner than the remainder of the multi-purpose reclosable zipper strip 100. The splotch seal portions 100F thus act as eye marks to indicate the position of the multi-purpose reclosable zipper strip 100. In the preferred embodiment, the optical sensor 180 utilizes a piezoelectric bridge to convert changes in opacity of the multi-purpose reclosable zipper strip 100 at the thinned portions (splotch seal sections 100F) to an electrical signal to advance the multi-purpose reclosable zipper strip 100 a desired length.

When optical sensor 180 detects one of the splotch seal portions 100F of the multi-purpose reclosable zipper strip 100, it signals belt tracks 340 and 350 (see FIGS. 2 and 3), which utilize belt drive 360 to advance a desired length of the multi-purpose reclosable zipper strip 100 over elevator 230. Guillotine knife 370, driven by another servomotor 410, is then signaled to descend and cut selected portion 420 of the multi-purpose reclosable zipper strip 100. Section 420 of the multi-purpose reclosable zipper strip 100 is thus positioned over and deposited onto elevator 230. Both the operation of belt drive 360 and guillotine knife 370 can be sequenced using pneumatic control devices such as those manufactured by Matrix Technologies or by utilizing a computer control system such as those manufactured by Allen Bradley.

Figure 3:
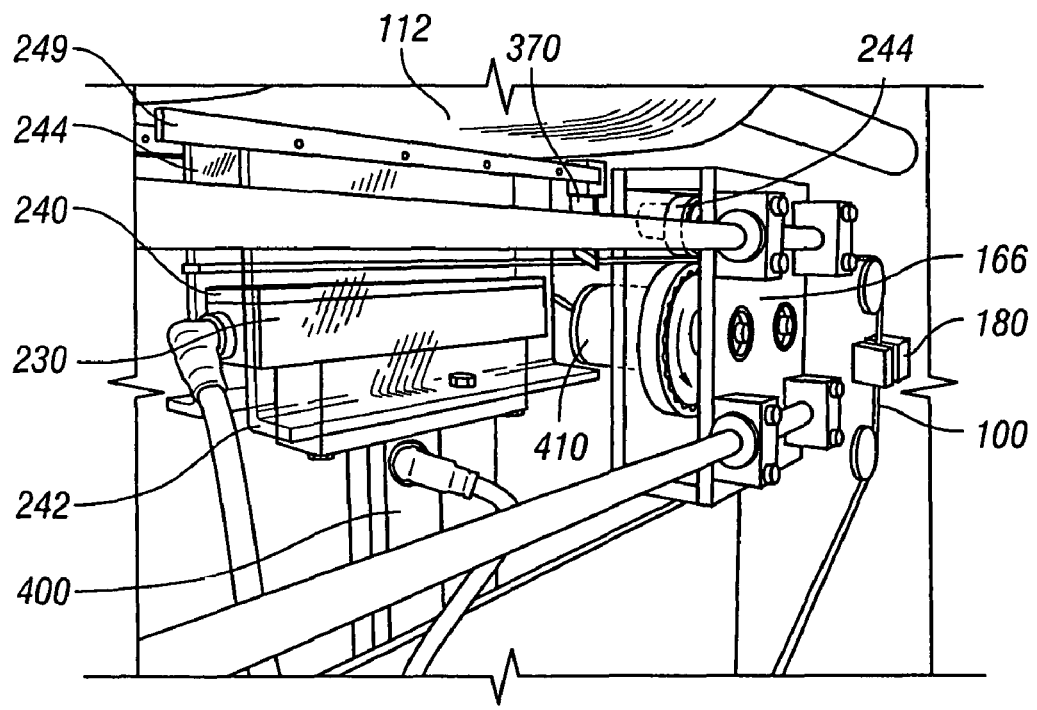
FIG. 3 is a partial front perspective view of the apparatus of FIG. 1 showing the pneumatically activated elevator of FIG. 2 having an opening in the center thereof for reception of a sealing head from above the web of flexible film.
Figure 4:
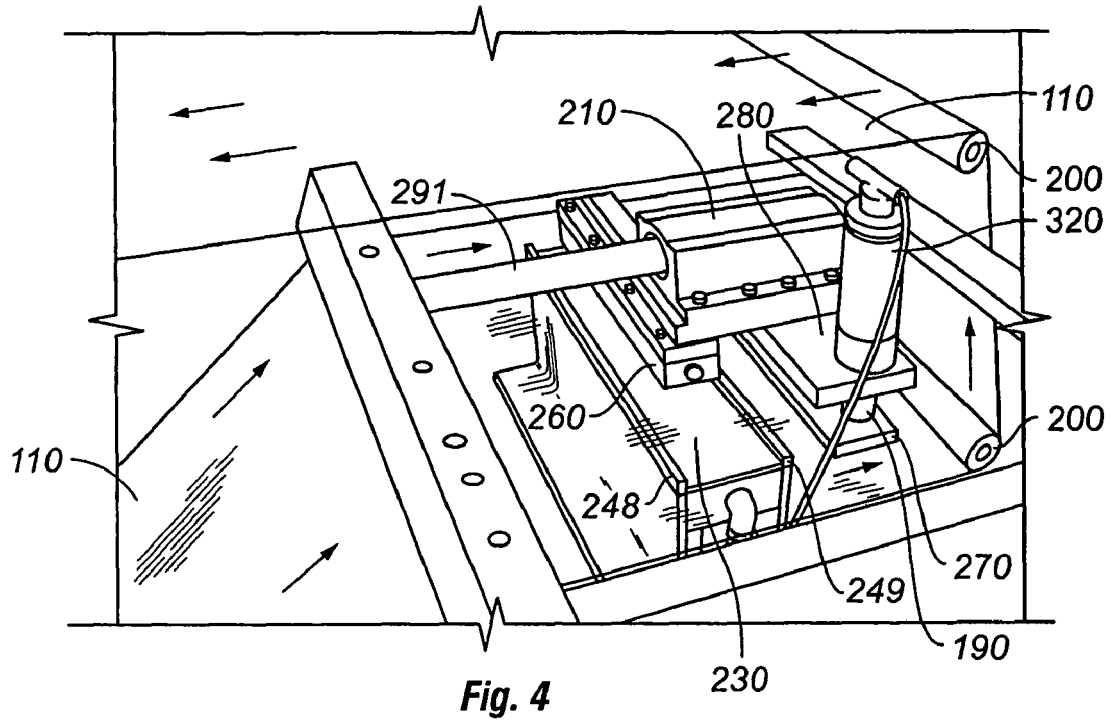
FIG. 4 is a top perspective view of a sealing head and perforation die positioned above the web of flexible film, with the sealing head positioned to the side of the elevator and the perforation die positioned over the elevator.

As shown in FIG. 3, in a preferred embodiment, the top surface of elevator 230 comprises a rectangular platform 240 for receiving section 420 of the multi-purpose reclosable zipper strip 100. As the selected portion 420 of the multi-purpose reclosable zipper strip 100 is being positioned and deposited onto platform 240 in the foregoing manner, the flexible material web 110 is being positioned above platform 240 as shown in FIG. 4. A series of eye marks is printed along one edge of the flexible material web 110 and is detected by a second optical sensor 190 shown in FIG. 5. The flexible material web 110 is advanced through apparatus 120 by a series of roll drivers 200, 202 (shown in FIGS. 2 and 11), which are driven by a second servomotor 210 shown in FIG. 5. The speed of roll drivers 200, 202 is coordinated by the optical sensor 190 and a computer 220 (shown in FIG. 6B), so that a desired portion of the flexible material web 110 is positioned over elevator 230 to receive the selected portion 420 of the multi-purpose reclosable zipper strip 100.

In one embodiment, the multi-purpose reclosable zipper strip 100 is mounted on a roller spool 130 (see FIG. 6). As the multi-purpose reclosable zipper strip 100 is pulled through a series of dancer rollers 150 (FIG. 11) mounted on dancer arm 160, roll drivers 200 pull the multi-purpose reclosable zipper strip 100 therethrough. When additional multi-purpose reclosable zipper strip 100 is pulled through dancer rollers 150, the upstream dancer arm 160 rises, causing coils 522 in springs 524 to stretch under tension (FIG. 6A). When the dancer arm 160 reaches a preset position, the dancer arm 150 returns to an initial lower position. The coils 522 under tension pull the dancer arm 160 down to receive the multi-purpose reclosable zipper strip 100 being advanced through the three-loop dancer roll assembly 150 and the process is then repeated.

Figure 5:
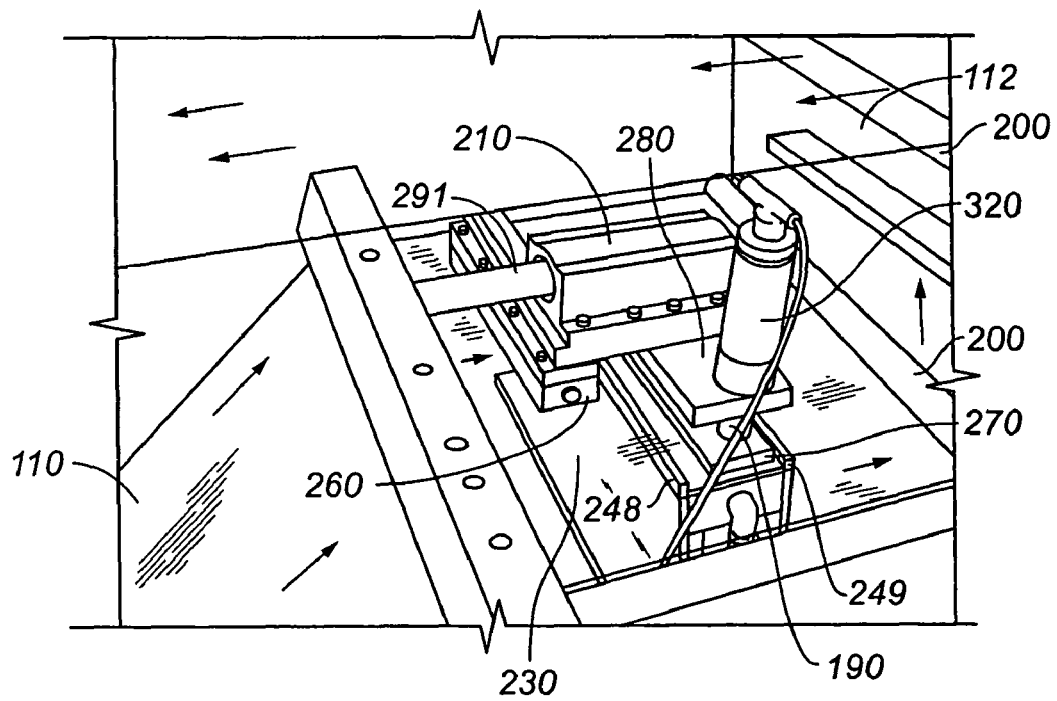
FIG. 5 is a top perspective view of a sealing head and perforation die positioned above the web of flexible film, with the sealing head positioned over the elevator and the perforation die positioned to the side of the elevator.
Figure 6B:
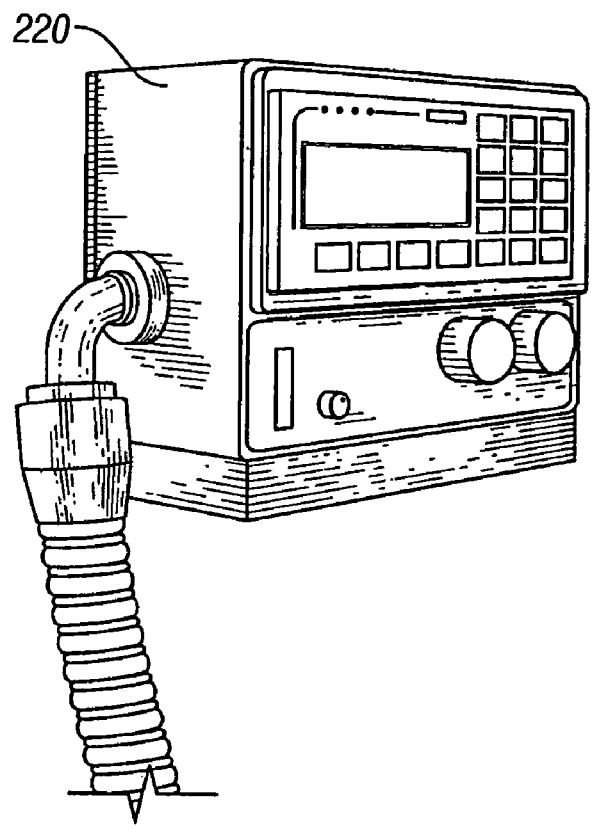
FIG. 6B is a front perspective view of a computer used to control the apparatus of FIG. 1.

As shown in FIG. 3 according to one embodiment, elevator 230 is contained within a hollow Lexan® pedestal 242 defining a central opening 244 in which the platform 240 is positioned. As shown in FIGS. 4 and 5, a pair of rectangular ledges 248 and 249 are located at the top of the pedestal 242. When the selected portion of the flexible material 110 is fed into position over the platform 240, the selected portion of the flexible material 110 extends over and between the pair of rectangular ledges 248 and 249.

As shown in FIGS. 4 and 5, a pneumatically controlled sealing head 270 is mounted on block 280, which in turn is slidably mounted on shaft 291. As shown in FIG. 4, sealing head 270 and block 280 are positioned above the pair of rectangular ledges 248 and 249 and to the side of platform 240. Following the deposit of section 420 of the multi-purpose reclosable zipper strip 100 the multi-purpose reclosable zipper strip 100 onto platform 240 and the positioning of the flexible material web 110 above the platform 240, the block 280 is driven horizontally by an air cylinder 320 until the sealing head 270 is positioned above platform 240 and, preferably, in contact with the flexible material web 110. Sealing head 270, which is preferably Teflon® coated, is then either heated to the desired sealing temperature or maintained at the desired sealing temperature.

Figure 7:
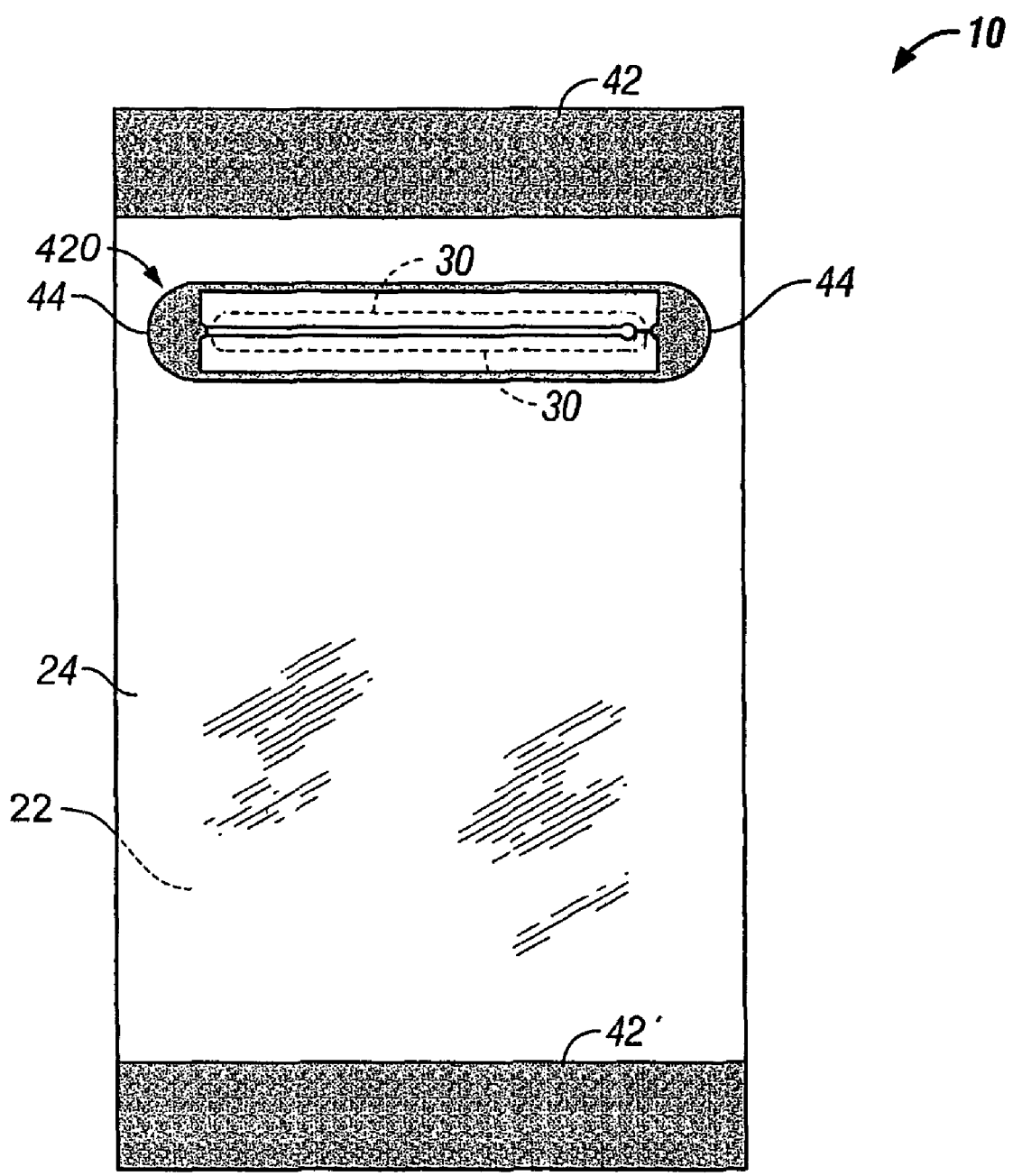
FIG. 7 is a front plan view of a bag manufactured using the present invention.
Figure 8:
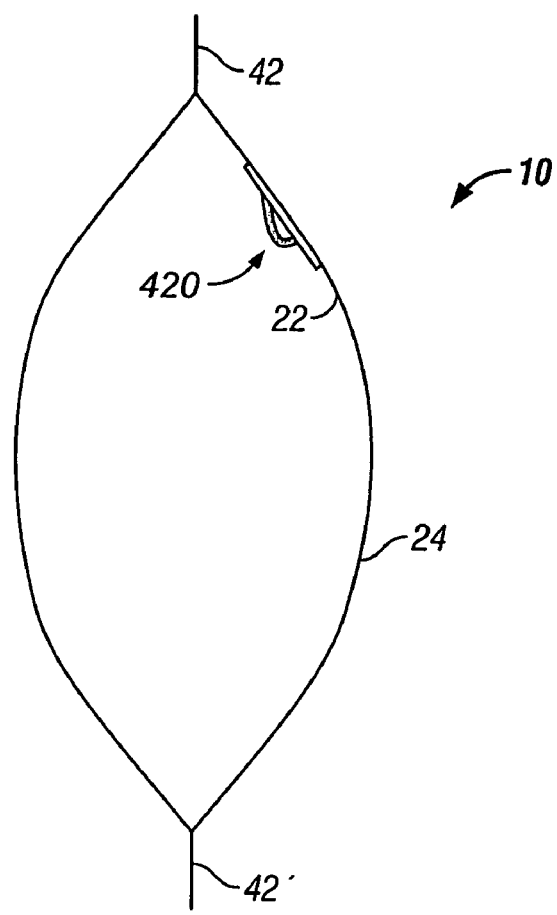
FIG. 8 is a side cutaway view of the bag of FIG. 7.

At the same time, elevator 230 is driven upwardly by shaft 400 until platform 240 (and the zipper tape portion 420 thereon) is in contact with the flexible material web 110. The heat passing through the flexible material web 110 from the sealing head 270 is sufficient to seal the peripheral portions of zipper tape portion 420 of the multi-purpose reclosable zipper strip 100 (as seen in FIG. 10) to the flexible material web 110, thereby sealing the zipper tape portion 420 positioned on the rectangular platform 240 to the flexible material web 110 to create a fastener attached material web 112. Sealing head 270 further aids in creating the seal, as shown in FIG. 7, by providing a stable surface against which the elevator 230 can compress the flexible material web 110 and the zipper tape portion 420.

The resulting seal 44 is airtight due to the construction of the multi-purpose reclosable zipper strip 100, which has thickened flanges 30 (shown in FIG. 7) that melt and fill any gaps during sealing to further form the seal. Section 420 of the multi-purpose reclosable zipper strip 100 is also airtight throughout the zipper portions because of the unique construction of the zippers themselves, as disclosed in parent U.S. patent application Ser. No. 09/415,696, incorporated herein by reference.

In one embodiment, a pneumatically controlled perforation knife 260 is mounted to block 280. When air cylinder 320 is actuated, perforation knife 260 descends downwardly so that perforation knife 260 perforates flexible material web 110 between the pair of rectangular ledges 248 and 249, which serve as an anvil against which the flexible material web 110 is severed by the perforation knife 260. The air cylinder 320 then retracts the perforation knife 260. In a preferred embodiment, sealing head 270 and perforation knife 260 may be combined so that the perforation of the flexible material web 110 and the sealing of zipper tape portion 420 may be accomplished simultaneously. Alternatively, the sealing head 270 can be moved into place over platform 240 after the flexible material web 110 has been severed by perforation knife 260. In another embodiment, fastener attached material web 112 is not perforated, but is fed and wound onto a winder 580 to create a zippered roll stock 590 with the multi-purpose reclosable zipper strip 100 already sealed on the flexible material web 110 for later use in a bagging machine 510 (see FIG. 11).

While the present invention has been disclosed in terms of the preferred embodiments in order to facilitate better understanding of the invention, it should be appreciated that the invention can be embodied in various ways without departing from its basic principles. Therefore, the invention should be understood to include all possible embodiments and modifications that do not depart from the invention as set out in the appended claims.

We claim:

1. An apparatus for substantially watertight and airtight sealing of a portion of a plastic zipper tape to a web section, the apparatus comprising:
   an elevator having a platform for receiving the portion of plastic zipper tape having fused ends, the plastic zipper tape including interlocked male and female elements and a splotched portion;
   means for depositing the portion of plastic zipper tape onto the platform;
   means for positioning the web section above the platform so that the platform may be moved vertically allowing the plastic zipper tape and web section to come into contact;
   a sealing head positioned over the web section for heating the web section, means for elevating the platform, directly and upwardly, towards the web section until the portion of plastic zipper tape comes into contact with the web section to form a seal between at least a portion of the portion of the plastic zipper tape and the web section, and
   wherein the apparatus further comprises a sensor for optically detecting variations in the opacity of the zipper tape and for detecting the splotched portion to obtain a signal, and a cutter for cutting said plastic zipper tape in response to said signal to create the portion of plastic zipper tape.

2. The apparatus of claim 1, wherein the sealing head is in contact with the web section when the portion of plastic zipper tape comes into contact with the web section.

3. The apparatus of claim 1, further comprising a cutter for perforating the web section.

4. The apparatus of claim 1, wherein the cutter comprises a knife positioned above the web section.

* * * * *